(12) United States Patent
Houchen et al.

(10) Patent No.: US 11,265,711 B2
(45) Date of Patent: Mar. 1, 2022

(54) PROXIMITY-BASED MANAGEMENT OF A COMPUTING DEVICE

(71) Applicant: Microsoft Technology Licensing, LLC, Redmond, WA (US)

(72) Inventors: Stephen Hoyt Houchen, Redmond, WA (US); Charles Albert Vermette, Jr., Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 16/570,458

(22) Filed: Sep. 13, 2019

(65) Prior Publication Data

US 2021/0084495 A1 Mar. 18, 2021

(51) Int. Cl.
*G06F 7/04* (2006.01)
*G06F 15/16* (2006.01)
*G06F 17/30* (2006.01)
*H04L 29/06* (2006.01)
*H04W 12/065* (2021.01)
*H04W 12/082* (2021.01)

(52) U.S. Cl.
CPC ......... *H04W 12/065* (2021.01); *H04L 63/107* (2013.01); *H04L 63/108* (2013.01); *H04L 63/18* (2013.01); *H04W 12/082* (2021.01)

(58) Field of Classification Search
CPC .............. H04W 12/065; H04W 12/082; H04L 63/107; H04L 63/108; H04L 63/18; G08C 2201/62; G08C 17/00
See application file for complete search history.

(56) References Cited

U.S. PATENT DOCUMENTS

| 7,574,747 | B2 | 8/2009 | Oliveira et al. |
| 9,258,207 | B2 | 2/2016 | Zollinger et al. |
| 9,642,173 | B2 | 5/2017 | Granbery |
| 9,996,311 | B2 | 6/2018 | Gates et al. |
| 10,135,798 | B2 | 11/2018 | Ulbrich |

(Continued)

FOREIGN PATENT DOCUMENTS

JP 2018178651 A 11/2018

OTHER PUBLICATIONS

"International Search Report and Written Opinion Issued in PCT Application No. PCT/US20/038282", dated Sep. 15, 2020, 10 Pages.

*Primary Examiner* — Amie C. Lin
(74) *Attorney, Agent, or Firm* — NovoTechIP International PLLC

(57) ABSTRACT

Techniques for enabling a user computing device to manage a controlled device only when the user computer device is physically proximate to the controlled device are disclosed. The controlled device repeatedly provides codes that change at select times and the user computing device sends the last received or captured code back to the controlled device. The user computing device is enabled to manage the controlled device when the most recent code sent by the user computing device matches one or more codes most recently provided by the controlled device. Additionally or alternatively, the user computing device is enabled to manage the controlled device when the user and controlled devices connect to the same access point. A technique for enabling the user computing device to share, mirror, or cast a screen on the user computing device onto a display of the controlled device is also disclosed.

18 Claims, 16 Drawing Sheets

(56) References Cited

U.S. PATENT DOCUMENTS

| | | | |
|---|---|---|---|
| 2012/0331538 A1* | 12/2012 | Yuan | H04L 63/18 |
| | | | 726/7 |
| 2013/0346494 A1 | 12/2013 | Nakfour et al. | |
| 2014/0171025 A1* | 6/2014 | Graube | G01S 5/06 |
| | | | 455/411 |
| 2014/0220883 A1 | 8/2014 | Emigh et al. | |
| 2014/0282923 A1* | 9/2014 | Narayan | H04L 9/3228 |
| | | | 726/5 |
| 2015/0055779 A1* | 2/2015 | Enomoto | H04L 9/3273 |
| | | | 380/270 |
| 2017/0039630 A1* | 2/2017 | Daigle | G06Q 30/0623 |
| 2017/0245101 A1 | 8/2017 | Chandrasekaran et al. | |
| 2017/0257760 A1 | 9/2017 | Moran et al. | |
| 2017/0359339 A1 | 12/2017 | Hevizi et al. | |

* cited by examiner

PROXIMITY-BASED MANAGEMENT OF A COMPUTING DEVICE

BACKGROUND

Computing devices are used for a variety of purposes, including controlling other computing devices ("controlled devices"). Example controlled devices include, but are not limited to, a display device, an audio device, a television, and a projector. In some instances, the control of the controlled devices is performed over a network, such as a network. However, a Wi-fi network is not always secure from unauthorized users. A network can be compromised such that an unauthorized user is able to control the operations of the controlled devices.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein enable a user computing device to manage a controlled device only when the user computer device is physically proximate to the controlled device. In one embodiment, two different communication channels are established between the user computing device and the controlled device. One communication channel is a short-range wireless connection and the other communication channel is a network channel, such as a cloud-based network connection. The controlled device repeatedly transmits a rotating code over the short-range wireless channel and the user computing device sends the last received code back to the controlled device over the network channel. As used herein, the phrase "rotating code" is a code that changes periodically or at select times. For example, the rotating code can change after a certain number of codes are transmitted or the code may change every N seconds. The user computing device is enabled to manage the controlled device when the code transmitted by the user computing device matches the code transmitted (or one of several codes recently transmitted) by the controlled device.

In another embodiment, the user computing device is enabled to manage the controlled device when the user computing device and the controlled device are connected to the same access point. In yet another embodiment, the controlled device repeatedly provides a rotating image and/or a rotating audio signal (e.g., a rotating code) and the user computing device sends the last received code back to the controlled device over the network channel. The user computing device is enabled to manage the controlled device when the code transmitted by the user computing device matches a recent code provided by the controlled device (e.g., one of several codes recently provided).

In one aspect, a method includes a controlled device repeatedly providing a rotating code that changes after an expiration of a time period. The controlled device repeatedly receives a received code from a user computing device over a network channel. The controlled device enables the user computing device to manage the controlled device over the network channel based on a determination that each received code from the user computing device matches one or more codes recently provided by the controlled device. For example, each received code can match the most recently provided code or one of several recently provided codes.

In another aspect, a controlled device includes a network communication device, a processing device operably connected to the network communication device, and a memory operably connected to the processing device. The memory stores instructions that when executed by the processing device, cause the controlled device to provide a rotating code at select times, where the rotating code changes after every expiration of a time period. A code is received by the controlled device from a user computing device over a network channel using the network communication device. A determination is made as to whether the received code matches a recently provided rotating code. Based on a determination that the received code matches the recently provided rotating code, the user computing device is enabled to manage the controlled device over the network channel.

In yet another aspect, a computer-implemented method includes a controlled device transmitting a rotating code over a short-range wireless connection to a user computing device. The rotating code is transmitted periodically or at select times and the rotating code changes periodically. The rotating code includes at least a first code and a second code that differs from the first code. The controlled device receives a third code from the user computing device over a network channel. Based on a determination that the third code matches one of the first code or the second code, the user computing device is enabled to manage the controlled device. The controlled device receives a heartbeat signal from the user computing device over the network channel, where the heartbeat signal includes the rotating code. The controlled device continues to enable the user computing device to manage the controlled device as long as the last received rotating code in the heartbeat signal matches a current rotating code transmitted over the short-range wireless connection.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
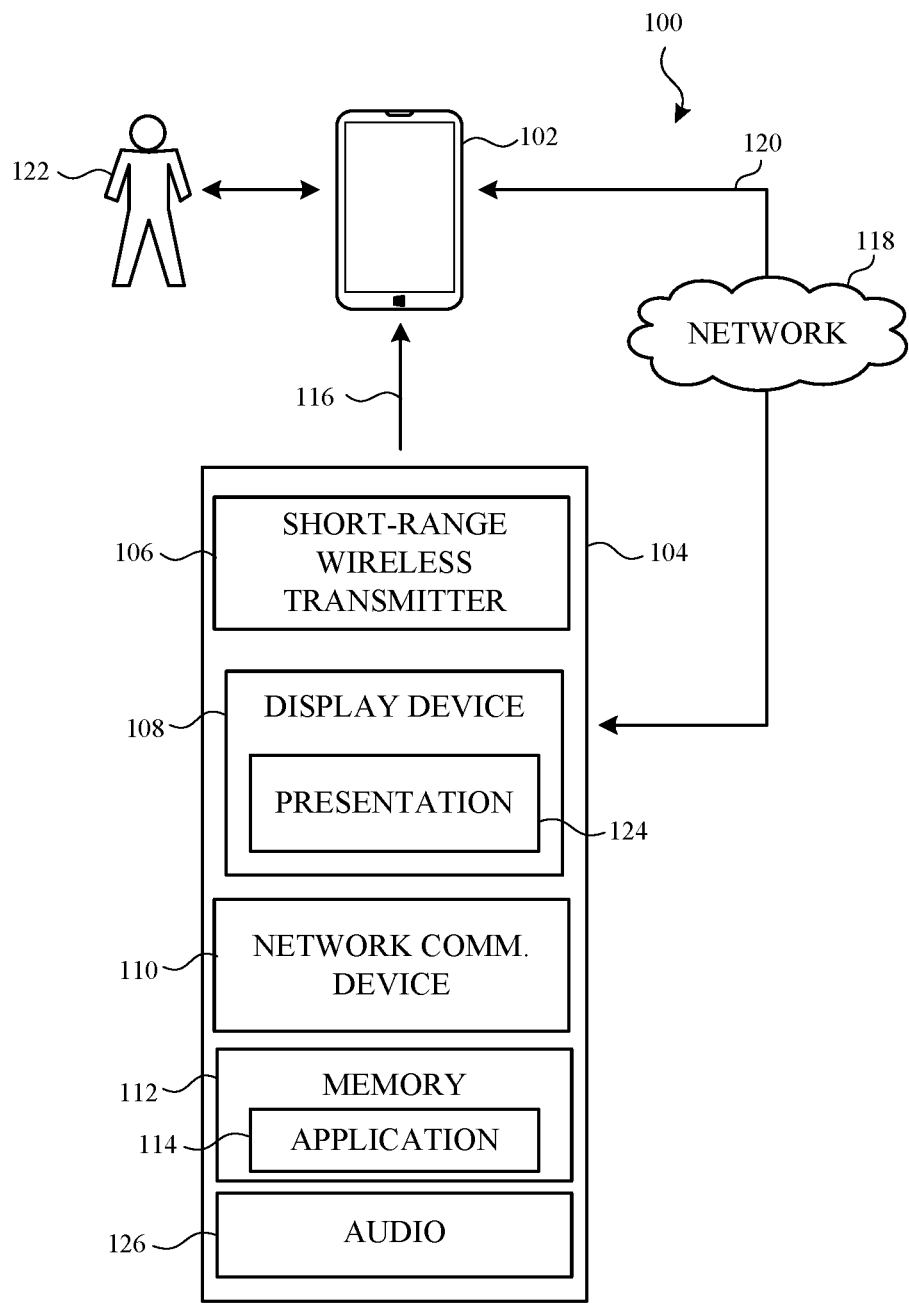
FIG. 1 illustrates a first example system in which a user computing device manages a controlled device.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide techniques for enabling a user computing device to manage a controlled device only when the user computer device is physically proximate to the controlled device. In one embodiment, two different communication channels are established between the user computing device and the controlled device. One communication channel is a short-range wireless channel and the other communication channel is a network channel, such as a cloud-based network connection. The controlled device transmits a rotating or changing code over the short-range wireless channel and the user computing device sends the last received code back to the controlled device over the network channel. The user computing device is enabled to manage the controlled device when the code transmitted by the user computing device matches the code transmitted (or one of several codes recently transmitted) by the controlled device.

In another embodiment, the user computing device is enabled to manage the controlled device when the user computing device and the controlled device are connected to the same access point. The physical proximity of the user computing device to the controlled device can be confirmed using a location-based system, such as a Global Positioning System. In yet another embodiment, the controlled device provides a rotating code that is captured or obtained by the user computing device. The user computing device sends the last received code back to the controlled device over the network channel. The user computing device is enabled to manage the controlled device when the code transmitted by the user computing device matches the code transmitted (or one of several codes recently transmitted) by the controlled device.

The controlled device can be any suitable device, including, but not limited to, a television, a projector, a display, and one or more speakers. Embodiments described herein relate to a user computing device managing a presentation displayed on a controlled device. Management of the presentation includes controlling the presentation and interacting with the presentation (e.g., submitting input, receiving output, closing the presentation, opening one or more presentations). In a non-limiting example, a user computing device can be used to stop or start a slide presentation displayed on a display or a television. Additionally or alternatively, the user computing device can be used to modify the presentation by adding or deleting slides in the slide presentation. In some instances, the user computing device is used to post notes, comments, or a document to a presentation (e.g., a web site).

In other embodiments, the controlled device is a projector or one or more speakers. In such example embodiments, the user computing device can be used to adjust the volume of an audio playback on the speaker(s) or changing a slide displayed by the projector to another slide. In still other embodiments, the user computing device can control and/or interact with any operation, application, or setting on the controlled device.

As used herein, the phrases "rotating code", "rotating image", and "rotating audio signal" are a code that changes periodically or at select times. For example, the rotating code can change after a certain number of codes are transmitted or the code may change every N seconds.

Non-limiting and non-exhaustive examples are described with reference to the following FIGS. 1-14. The elements of the drawings are not necessarily to scale relative to each other. Identical reference numerals have been used, where possible, to designate identical features that are common to the figures.

FIG. 1 illustrates a first example system in which a user computing device controls a controlled device. The system 100 includes a user computing device 102 and a controlled device 104. The user computing device 102 includes one or more short-range receivers or transceivers and one or more network communication devices (see e.g., 1222 and 1224 in FIG. 12). The controlled device includes one or more short-range wireless transmitters or transceivers (represented by short-range wireless transmitter 106), a display device 108, one or more network communication devices (represented by network communication device 110), and a memory 112 storing one or more applications (represented by application 114) that are used to display and manage a presentation displayed via a presentation application. The term "transmitter" used herein includes both a transmitter and a transceiver and the term "receiver" includes both a receiver and a transceiver.

In one embodiment, the controlled device 104 is configured to transmit a short-range wireless signal 116 using the short-range wireless transmitter 106. Example short-range wireless transmitters include, but are not limited to, a BLUETOOTH or a BLUETOOTH LOW ENERGY (BLE) beacon and an infrared (IR) transmitter. The user computing device 102 is configured to receive the short-range wireless signal 116 using the short-range wireless receiver. Example short-range wireless receivers include, but are not limited to, a BLUETOOTH or a BLE receiver and an IR receiver.

The user computing device 102 and the controlled device 104 are further configured to connect to each other via one or more networks (represented by network 118). The network channel 120 is implemented as a wired and/or a wireless network channel. The network 118 is illustrative of any suitable type of network, for example, an intranet, and/or a distributed computing network (e.g., the Internet). For example, the distributed computing network can provide a cloud-based network connection. The network channel is also representative of any suitable type of network channel. Example network channels include, but are not limited to, a Wi-Fi network channel, a wired network channel or a combination thereof.

In one embodiment, the presentation application 114 enables a user 122 to manage over the network channel 120 one or more presentations (represented by presentation 124) that is displayed on the display device 108. In a non-limiting example, the user 122, via the presentation application 114, starts and/or stops a slideshow presented on the display device 108. Additionally or alternatively, the user 122 modifies the order of the images and/or adds images to, or deletes images from, the slideshow.

As will be described in more detail in conjunction with FIGS. 2-5, in one embodiment the user computing device 102 is able to manage the presentation 124 when a short-range wireless signal 116 that includes a rotating code is transmitted from the controlled device 104 periodically or at select times over a short range wireless channel. In one aspect, the short range wireless channel is a one-way channel, such as a broadcast channel. In another instance, the short range wireless channel is a wireless channel that is established between the controlled device and the user computing device.

The user computing device transmits the rotating code back to the controlled device 104 over the network channel 120. In one embodiment, the code is included in a signal that is transmitted to the controlled device periodically or at select times. An example signal is a heartbeat signal that is sent periodically or at select times.

When the code transmitted back to the controlled device 104 over the network channel 120 matches one or more codes recently transmitted by the controlled device 104 in a short-range wireless signal 116, the user 122 can manage the presentation 124 displayed on the display device 108. As discussed earlier, in one embodiment, the controlled device 104 transmits the short-range wireless signal 116 with the code at select times or periodically. In another embodiment, the controlled device 104 broadcasts the short-range wireless signal 116 with the code only after a user computing device 102 attempts to connect to the controlled device 104 through the network channel 120.

In another embodiment, the controlled device can present the code on the display device 108 or output the code using the audio device 126. For example, the controlled device 104 may display a rotating image and the user computing device 102 captures each image via an image capture device. The user computing device 102 then sends the recently captured image (or data associated with the image) to the controlled device 104 to enable the controlled device 104 to confirm the proximity of the user computing device 102 to the controlled device 104. A non-limiting example of an image is a QR code (or the code is encoded in the QR code). Additionally or alternatively, the audio device 126 outputs a rotating audio signal at select times that the user computing device 102 captures and transmits to the controlled device 104. The frequency or frequencies of the audio signal can be at a frequency level that humans can hear or at a frequency level that humans cannot hear.

In some instances, a user 122 can share, mirror, or cast the screen on the user computing device 102 onto the display device 108 of the controlled device 104 using the network channel 120. Additionally or alternatively, audio may be transmitted from the user computing device 102 to the controlled device 104 using the network channel 120. The audio may be associated with, or separate from, the screencasting, screen sharing, or screen mirroring. In a non-limiting example, a user 122 can cast a presentation displayed on the user computing device 102 onto the display device 108 of the controlled device 104. An example method of screencasting is described in more detail in conjunction with FIG. 10.

In some embodiments, the user computing device 102 can be a personal or handheld computing device. For example, the user computing device 102 may be a smart phone, a tablet, a smart watch or other wearable computing device, a laptop computer, a gaming device/computer (e.g., Xbox), and the like. This list of user computing devices 102 is for example purposes only and should not be considered as limiting. Any suitable user computing device that is configured to receive a rotating code over a short-range wireless channel, transmit the code over a network channel, and manage a controlled device may employ aspects of the disclosure. Similarly, any user computing device that is configured to capture a rotating image or sound, transmit the image or sound over a network channel, and manage a controlled device can employ aspects of the disclosure Additionally, the controlled device 104 may be a smart phone, a tablet, a smart watch or other wearable computing device, a laptop computer, a desktop computer, a gaming device/computer (e.g., Xbox), a television, a projector, a sound system, one or more speakers in the sound system, a camera, and the like. The list of controlled devices 104 is for example purposes only and should not be considered as limiting. Any suitable controlled device that is configured to provide a rotating code at select times or periodically, receive the rotating code over a network channel, and enable a user computing device to manage a presentation or the controlled device may employ aspects of the disclosure.

Figure 2:
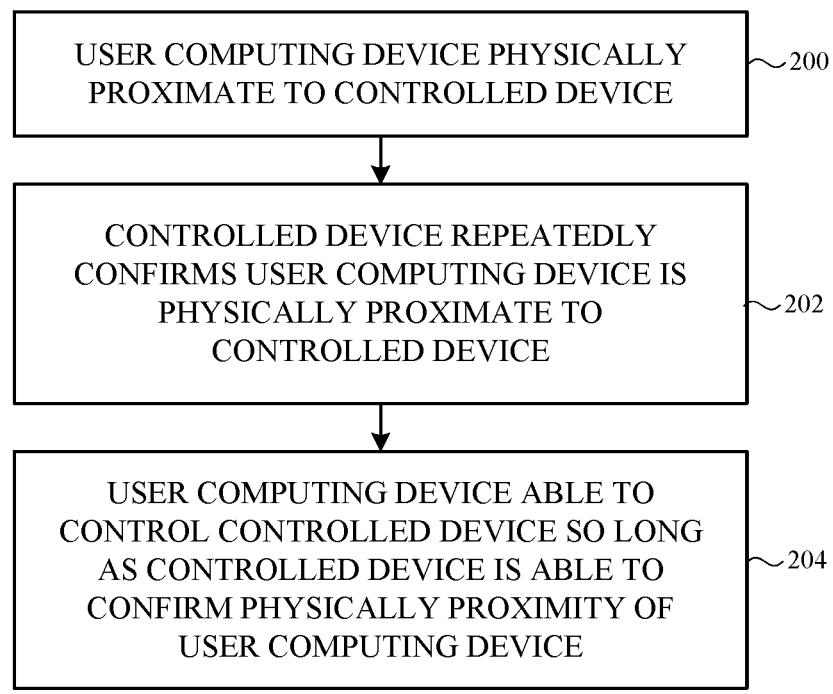
FIG. 2 depicts a flowchart of a first method of managing a controlled device shown in FIG. 1.

FIG. 2 depicts a flowchart of a first method of managing a controlled device shown in FIG. 1. Initially, a user computing device is positioned to be physically proximate to the controlled device (block 200). At block 202, the controlled device repeatedly determines the user computing device is physically proximate to the controlled device. For example, the controlled device transmits a rotating code over a short range wireless channel, displays a rotating code, and/or emits a rotating code that the user computing device receives or captures and transmits back to the controlled device.

As long as the user computing device is physically proximate to the controlled device and the controlled device is able to confirm the proximity based on the codes received from the user computing device, the user computing device is able to manage the controlled device at block 204. When the user computing device is no longer physically proximate to the controlled device, the user computing device will not receive or capture the new or recently changed codes. Accordingly, the user computing device will not transmit the most recent codes back to the controlled device. Accordingly, the controlled device determines the user computing device is not physically proximate to the controlled device. Based on this determination, the controlled device disconnects the user computing device from the controlled device and/or from the application running on the controlled device to prevent the user computing device from managing the controlled device.

Figure 3A:
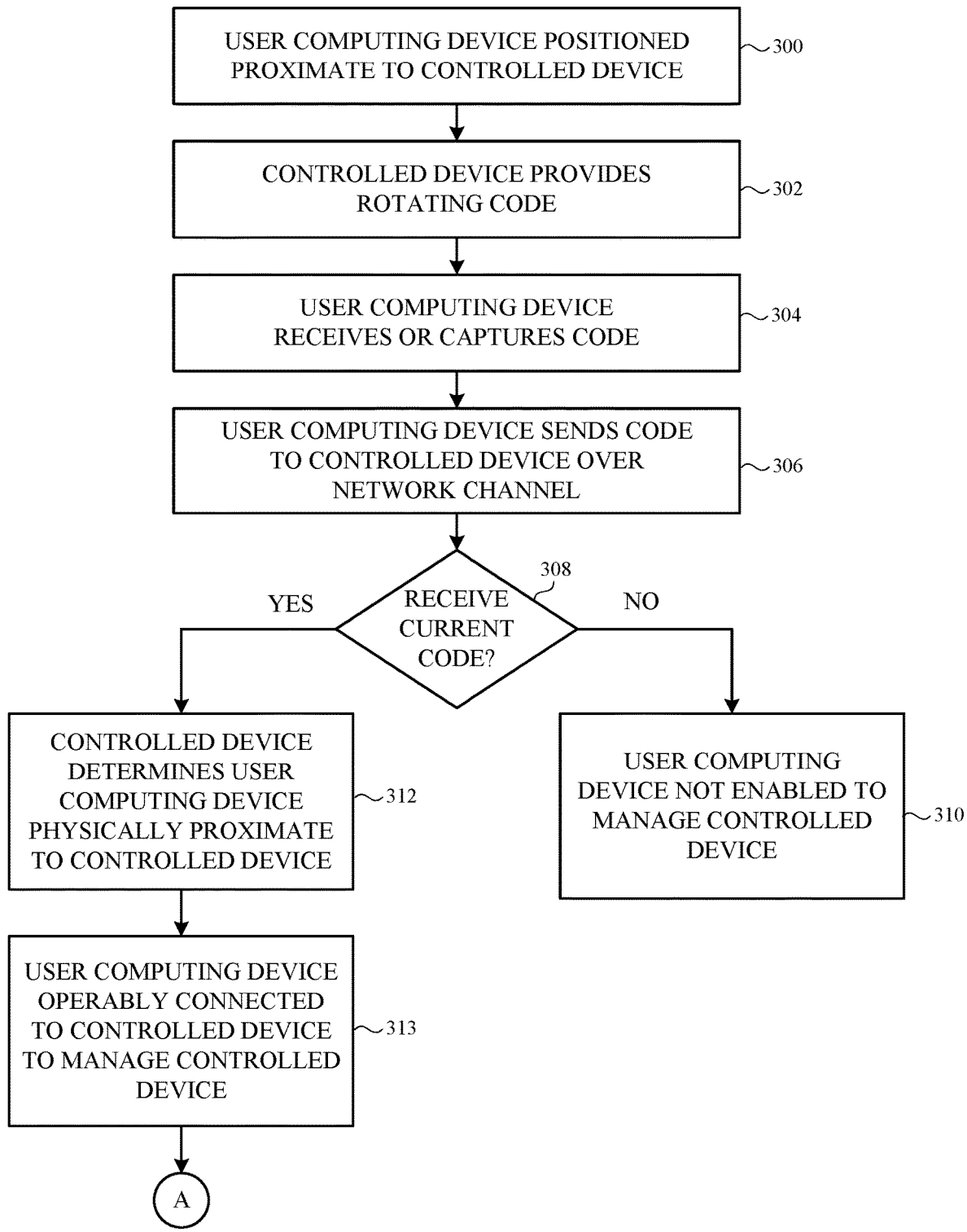
FIGS. 3A-3B illustrate a flowchart of a second example method of managing the controlled device shown in FIG. 1.
Figure 3B:
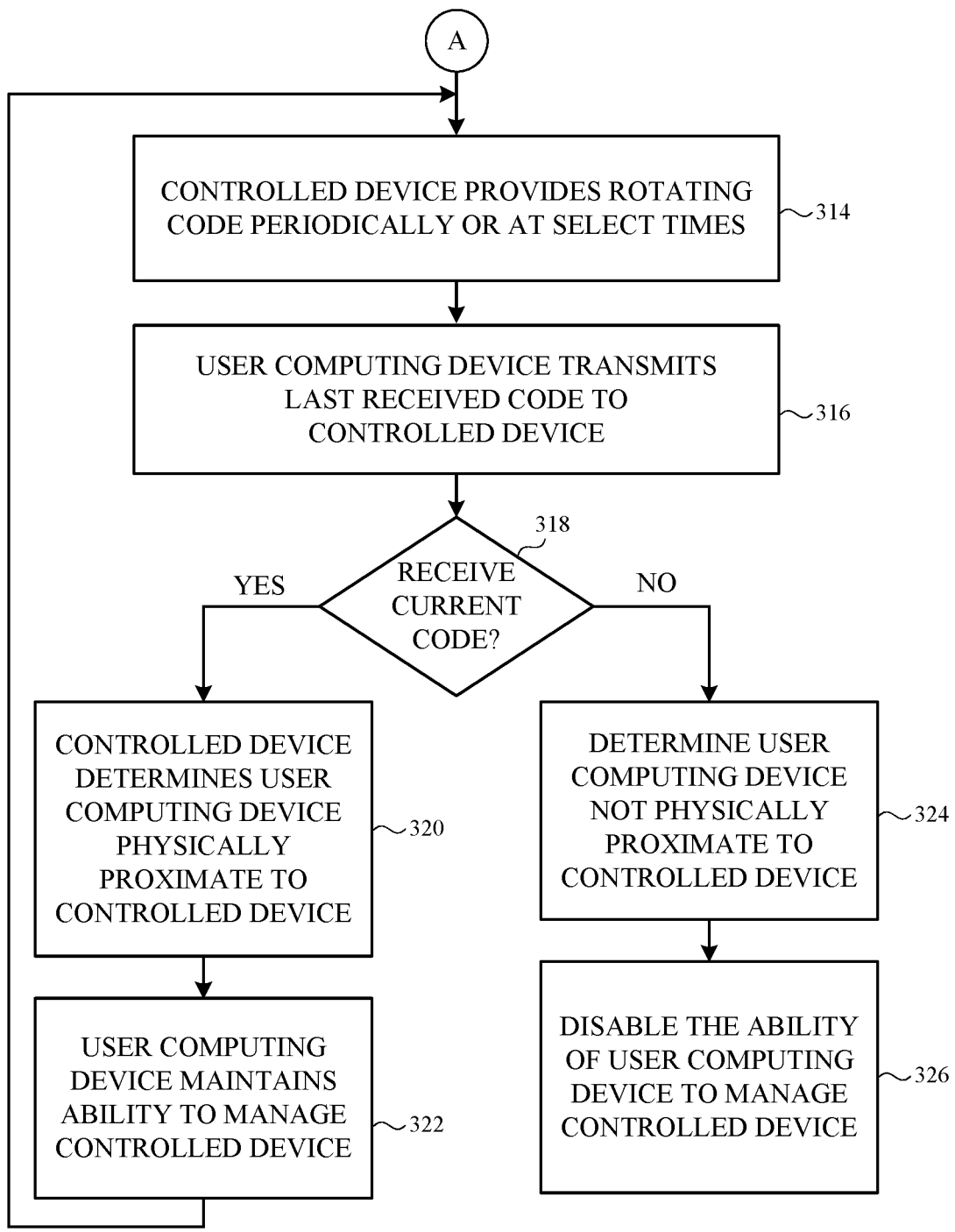

FIGS. 3A-3B illustrate a flowchart of a first example method of managing the controlled device shown in FIG. 1. As described earlier, the user computing device is used to manage one or more presentations displayed on the controlled device. Initially, the user computing device is positioned proximate to the controlled device to receive the short-range wireless signal (block 300). When the controlled device transmits the rotating code over the short-range wireless channel, the distance between the user computing device and the controlled device is based on the range of the short-range wireless transmitter or transceiver. For example, the range of a class 2 BLUETOOTH transmitter is approximately ten meters while the range of a class three BLUETOOTH transmitter is less than ten meters.

The short-range wireless transmitter within or operably connected to the controlled device transmits a short-range wireless signal that includes an M-bit code to the user computing device (block 302). The short-range wireless signal can include additional information in addition to the M-bit code, such as an identifier associated with the short-range wireless transmitter. In one embodiment, the short-range wireless signal is a wireless signal that is transmitted periodically or at select times and the M-bit code is an M-bit code or pseudo-random M-bit code that changes periodically or at select times. For example, the pseudo-random M-bit code is a 16-bit pseudo-random code that changes every N seconds or after P codes have been transmitted, where M and P are each a number that is greater than one.

When the controlled device displays the rotating code and/or emits an audio of the rotating code, the distance between the user computing device and the controlled device is based at least on the resolution and/or size of the image on the display or the volume of the audio. In general, the user computing device is typically within the same area of the controlled device so that the user computing device is able to capture the rotating code. For example, the user computing device can be in the same room as the controlled device or within a given distance from the controlled device (e.g., five to ten feet).

The user computing device receives or captures the rotating code at block 304 when the user computing device is within the range of the short-range wireless transmitter/transceiver or within the same area as the controlled device. The user computing device then transmits the received or captured code back to the controlled device over the network channel (block 306). In one embodiment, the user computing device transmits the code to the controlled device periodically or at select times (e.g., after receiving or capturing the most recent code). For example, the user computing device can transmit a heartbeat signal that includes the last code received over the short-range wireless channel. In some instances, the controlled device announces the heartbeat period after the user computing device connects to the controlled device over the network channel.

Next, as shown at block 308, the controlled device determines if the code received from the user computing device over the network channel matches one or more codes recently transmitted over the short-range wireless channel, presented on the display, and/or provided via an audio device. In one aspect, the controlled device determines if the code received from the user computing device matches the last transmitted or provided code. In another embodiment, the controlled device determines if the code received from the user computing device matches one of the last D codes transmitted to the user computing device, where D is a number equal to or greater than two. For example, the controlled device can determine if the code received from the user computing device matches the last code or the second to the last code transmitted over the short-range wireless channel.

When the code received from the user computing device over the network channel does not match the last code (or the last D codes), the user computing device is not enabled to manage the presentation (block 310). When the code received from the user computing device over the network channel matches the last code (or one of the last D codes), the controlled device determines the user computing device is physically proximate to the controlled device (block 312). At block 313, the user computing device is operably connected to the controlled device to enable the user computing device to manage the controlled device (e.g., manage a presentation displayed by the controlled device). After the user computing device is operably connected to the controlled device, the controlled device continues to transmit or provide the rotating code periodically or at select times (block 314). The user computing device continues to transmit the last received code to the controlled device via the network channel (block 316).

At block 318, the controlled device determines if each code it receives from the user computing device over the network channel matches the last provided code (or one of the last D provided codes). If so, the controlled device determines the user computing device remains proximate to the controlled device and the user computing device remains able to manage the controlled device via the network channel (e.g., manage the presentation displayed by the controlled device) (blocks 320, 322). The process then returns to block 314.

When a code received by the controlled device over the network channel does not match the last provided code (or one of the last D provided codes), the controlled device determines the user computing device is not physically proximate to the controlled device and disables the ability of the user computing device to manage the controlled device (blocks 324, 326). For example, the controlled device can disable or disconnect the network channel between the controlled device and the user computing device.

Although FIGS. 3A-3B describe transmitting the rotating code to the user computing device via the short-range wireless channel and the user computing device sending the code to the controlled device over the network channel, other embodiments are not limited to this configuration. In another embodiment, the code can be transmitted to the user computing device over the short-range wireless channel and the user computing device can send the code back to the controlled device over the short-range wireless channel. So long as the received code matches the transmitted code (or one of the last D transmitted codes), the user computing device is able to manage the controlled device over the network channel.

Figure 4:
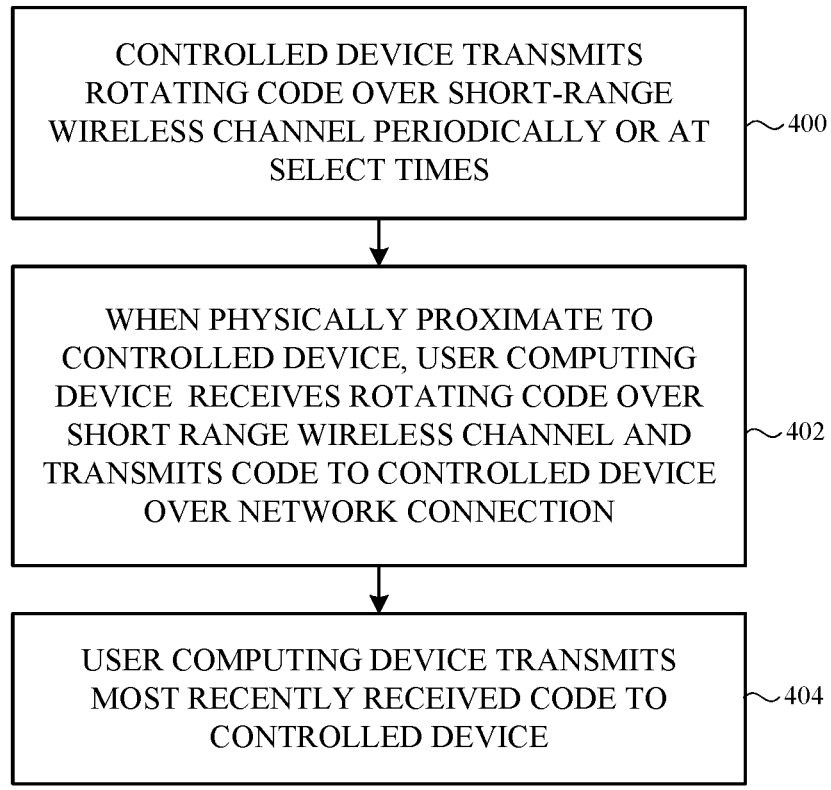
FIG. 4 depicts a first example method of confirming the user computing device is physically proximate to the controlled device.

FIG. 4 depicts a first example method of confirming the user computing device is physically proximate to the controlled device. Initially, as shown in block 400, the controlled device transmits the rotating code over the short-range wireless channel periodically or at select times. In one embodiment, the short-range wireless channel is a one way transmission or broadcast of the rotating code and any computing device within the range of the short-range wireless channel is able to receive the rotating code. Alternatively, in another embodiment, the short-range wireless channel is a two-way communication channel established between the user computing device and the controlled device. As described earlier, the code is an M-bit code or pseudo-random M-bit code that changes periodically or at select times (e.g., at the expiration of a given period of time).

When the user computing device is physically proximate to the controlled device, the user computing device receives the rotating code over the short-range wireless channel (block 402). The user computing device then transmits the most recently received code back to the controlled device (block 404). In one embodiment, the user computing device sends the most recently received code to the controlled device over the network channel. In another embodiment, the user computing device transmits the most recently received code to the controlled device over the short-range wireless channel.

Figure 5:
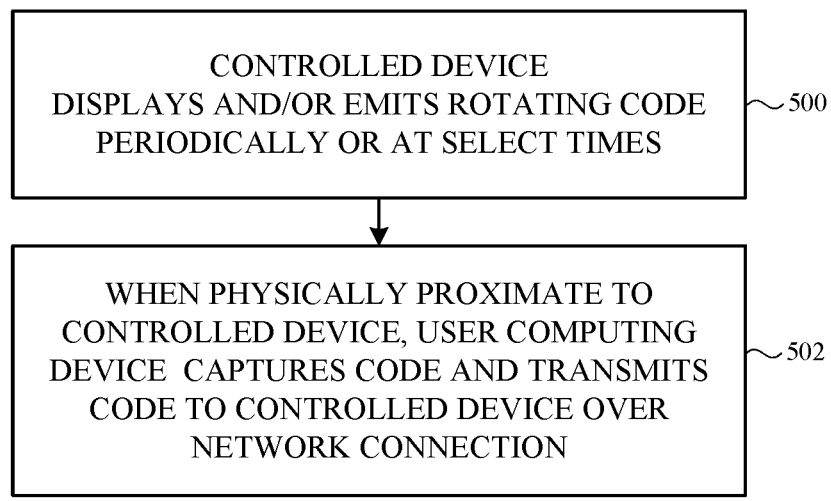
FIG. 5 illustrates a second example method of confirming the user computing device is physically proximate to the controlled device.

FIG. 5 illustrates a second example method of confirming the user computing device is physically proximate to the controlled device. Initially, the controlled device displays the rotating code and/or emits an audio signal of the rotating code periodically or at select times (block 500). In one embodiment, the rotating code is an image that changes at select times (e.g., after an expiration of a given period of time). Additionally or alternatively, the rotating code is an audio signal that changes at select times.

When the user computing device is physically proximate to the controlled device, the user computing device captures the rotating code and transmits the most recently received code to the controlled device over the network channel (block 502). For example, the user computing device can capture an image of the rotating code and transmit the image (or data associated with the image) to the controlled device. In another example, the user computing device may record the audio signal and transmit the audio signal (or data associated with the audio signal) to the controlled device.

Figure 6:
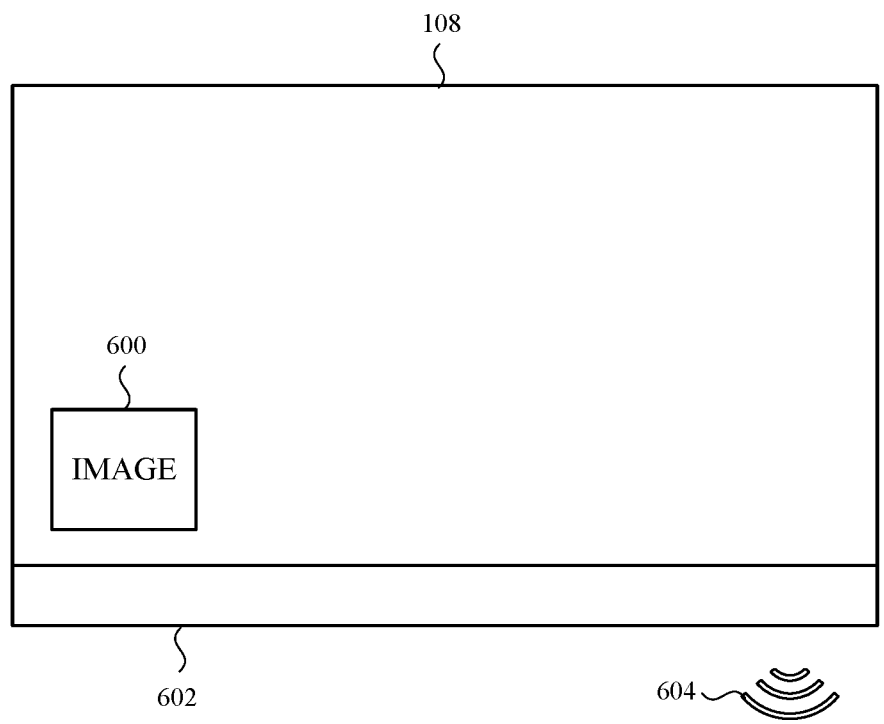
FIG. 6 depicts a display device of the controlled device providing the rotating code.

FIG. 6 depicts example techniques the controlled device can provide the rotating code. In one aspect, a display device 108 is included within, or is operably connected to, the controlled device. A rotating image 600 can be displayed by the display device at select times. As described earlier, the rotating image changes at select times (e.g., after N seconds). The rotating image 600 can be displayed continuously or at select times.

Additionally or alternatively, the controlled device includes one or more speakers 602 that emit a rotating audio signal 604 at select times. Like the rotating image, the rotating audio signal changes at select times. A user computing device can capture the rotating image 600 and/or the rotating audio signal 604 and transmit the most recently captured image and/or audio signal (or data associated with the image or audio signal) to the controlled device.

Figure 7:
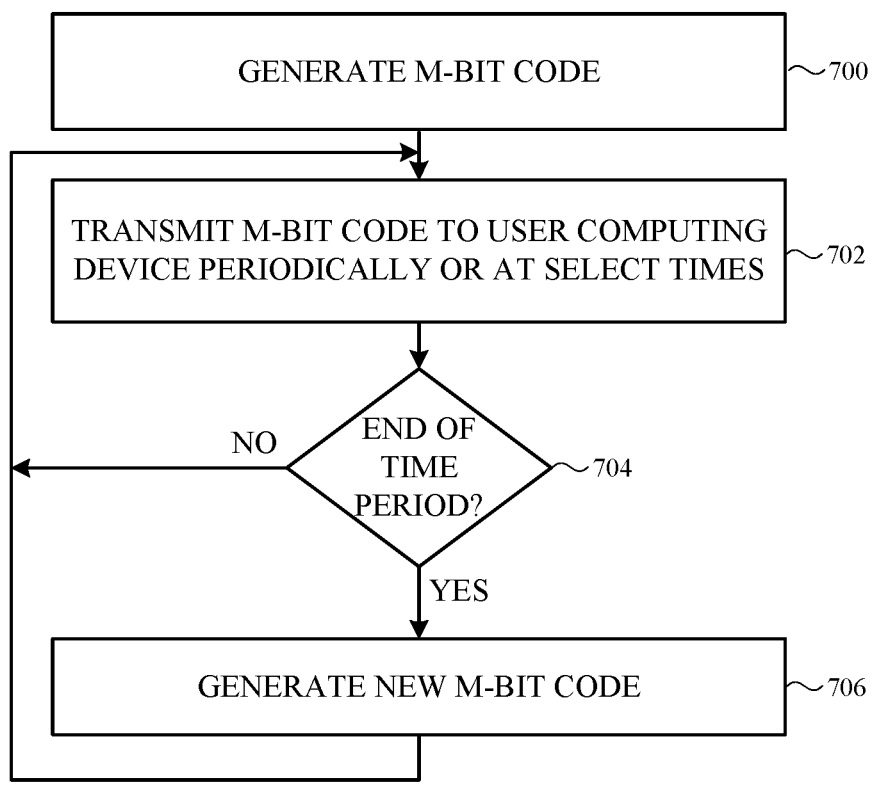
FIG. 7 illustrates a flowchart of an example method of generating and transmitting a code to a user computing device.

FIG. 7 illustrates a flowchart of an example method of generating and transmitting a code to a user computing device. The method can be used when the short range wireless channel is a one-way communication or broadcast channel. Initially, the controlled device generates an M-bit code, where M is a number greater than one (block 700). In an example embodiment, the M-bit code is a pseudo-random 16-bit code. Next, as shown in block 702, the controlled device transmits a short-range wireless signal that includes the code to the user computing device using the short-range wireless transmitter. The controlled device transmits the code periodically or at select times. A determination is made at block 704 as to whether a time period associated with the code has expired. If not, the method returns to block 702. When a determination at block 704 is that the time period has ended, the process passes to block 706 where a new M-bit code is generated. The method then returns to block 702.

In embodiments where the short range wireless channel is a two-way communication channel established between the controlled device and a user computing device, the controlled device generates and transmits the M-bit code only when the user computing device is proximate to the controlled device. In such embodiments, a determination is made at select times as to whether the connection between the user computing device and the presentation displayed by the presentation control application on the controlled device has been disconnected or disabled such that the user computing device is unable to manage the controlled device. If not, the method returns to block 702 repeats until the user computing device is unable to manage the controlled device. The controlled device stops transmitting the M-bit code in the short-range wireless signal when the user computing device is unable to manage the controlled device. In such situations, the controlled device may continue to generate the M-bit code to enable the controlled device to determine the user computing device is no longer physically proximate to the controlled device. For example, the user computing device can continue to send the last received code when the user computing device is no longer physically proximate to the controlled device. However, the last received code transmitted by the user computing device will not change because the user computing device is not receiving or capturing new codes. Having the controlled device continue to generate new codes periodically or at select times enables the controlled device to determine the user computing device is not physically proximate to the controlled device because the last received code sent by the user computing device will not match the new codes.

Figure 8:
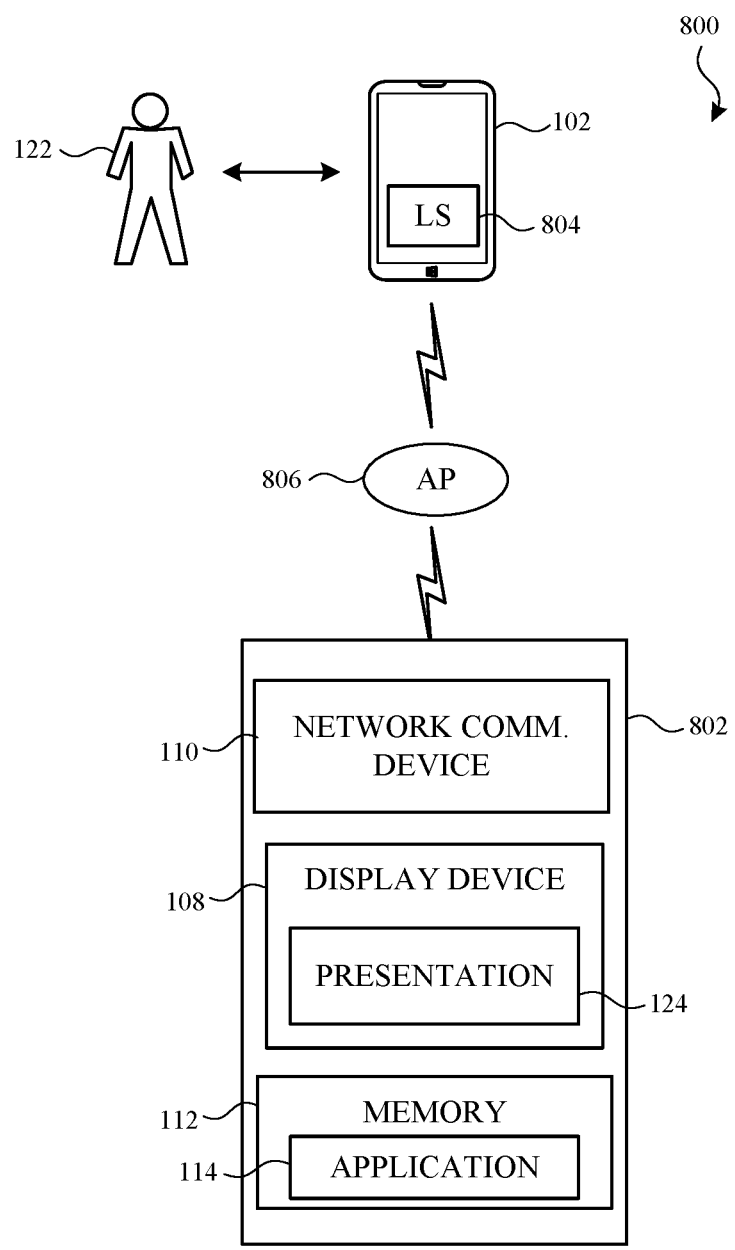
FIG. 8 depicts a second example system in which a user computing device manages a controlled device.

FIG. 8 depicts a second example system in which a user computing device manages a controlled device. The system 800 includes the user computing device 102 and a controlled device 802. The user computing device 102 includes one or more location-based services (represented by location-based service (LS) 804) and one or more network communication devices (see e.g., 824 in FIG. 8). The controlled device includes a display device 108, a network communication device 110, and a memory 112 storing one or more presentation control applications (represented by application 114).

The user computing device 102 and the controlled device 802 are each configured to connect to one or more network access points (represented by access point (AP) 806). The access point 806 can provide access to an intranet and/or a distributed computing network (e.g., the Internet). As will be described in more detail in conjunction with FIGS. 9A-9B, the user computing device 102 is able to manage the presentation 124 when both the user computing device 102 and the controlled device 802 are operably connected to the same access point 806.

Figure 9A:
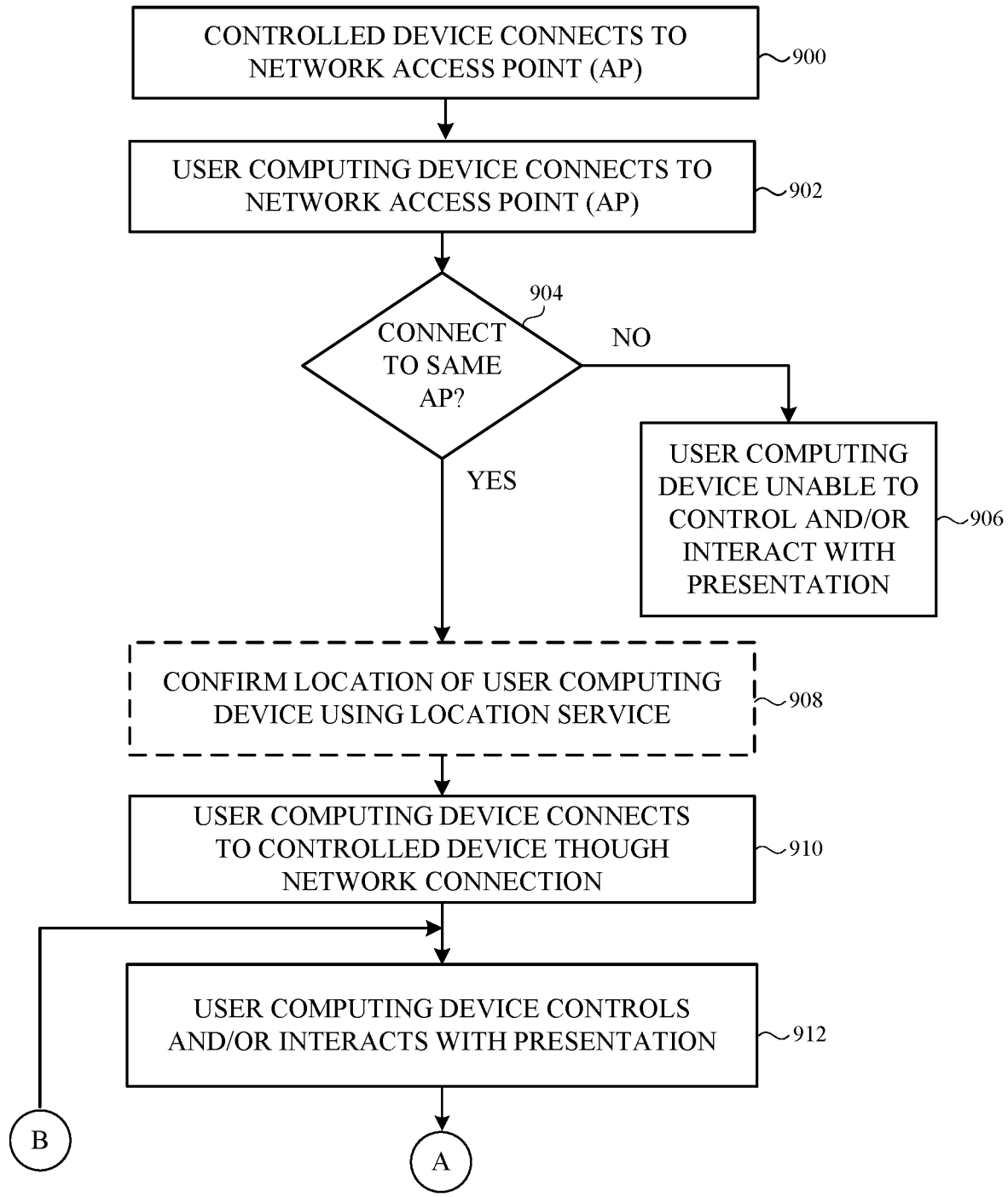
FIGS. 9A-9B illustrate a flowchart of a second example method of managing the controlled device shown in FIG. 8.
Figure 9B:
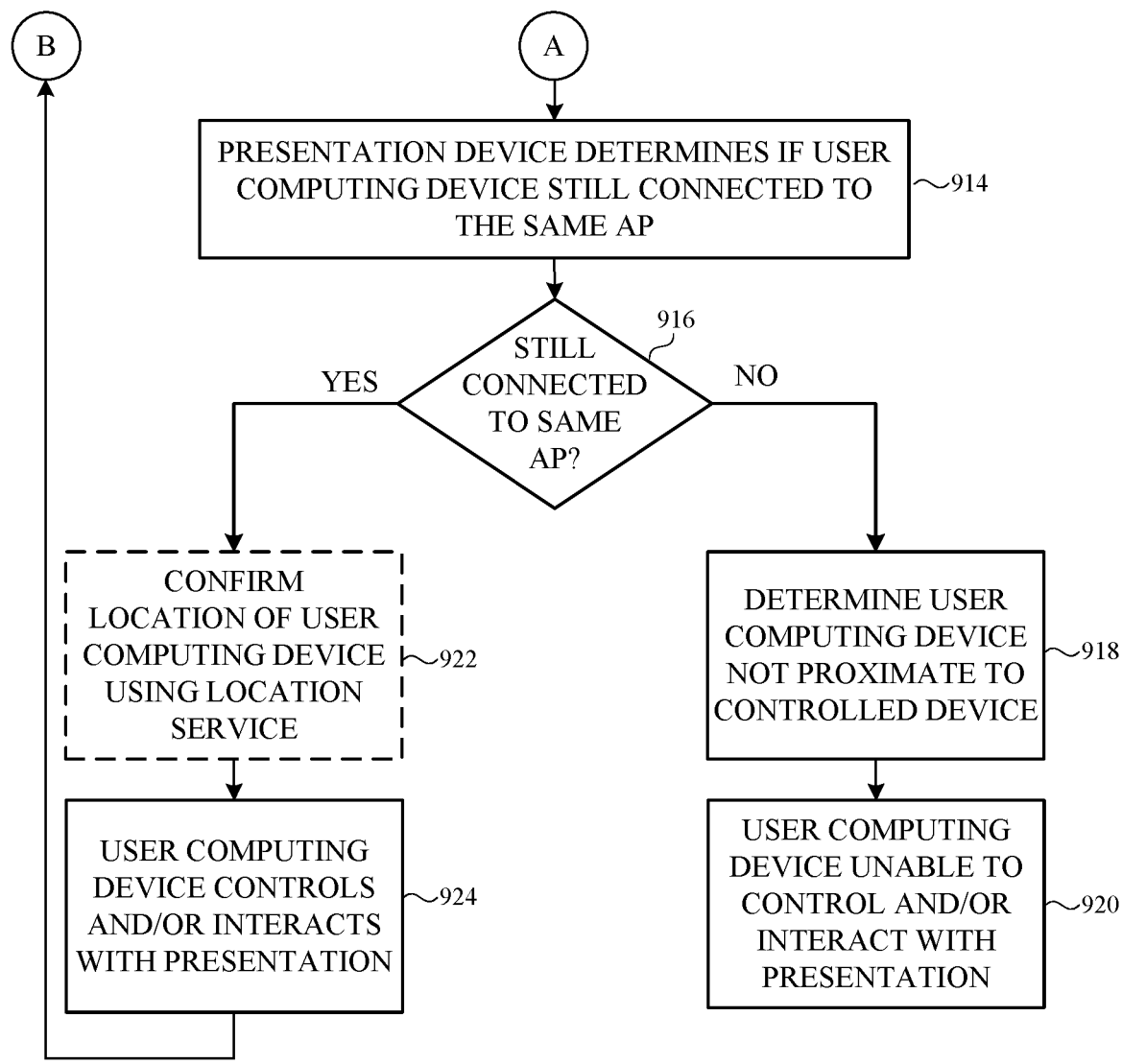

FIGS. 9A-9B illustrate a flowchart of a second example method of managing the presentation control device shown in FIG. 8. Initially, as shown in blocks 900 and 902, a controlled device operably connects to a network access point (AP) and a user computing device operably connects to an AP. A determination is then made at block 904 as to whether the user computing device and the controlled device are operably connected to the same AP. In a non-limiting example, the controlled device determines the user computing device and the controlled device are connected to the same AP by accessing the AP (e.g., the administrator console) and analyzing the IP addresses, the MAC addresses, and/or a host name.

If the user computing device and the controlled device are not operably connected to the same AP, the user computing device cannot manage the presentation displayed on the display device of the controlled device (block 906). When the user computing device and the controlled device are operably connected to the same AP, the user computing device can transmit location data associated with a location of the user computing device to the controlled device. The location of the user computing device can be determined using any suitable technique, including, but not limited to, a global positioning system or a Wi-Fi positioning system.

The location data associated with a location of the user computing device allows the controlled device to determine the location of the user computing device and confirm the user computing device is proximate to the controlled device. Block 908 is optional and can be omitted in other embodiments.

The process continues at block 910 where the user computing device connects to the controlled device through a network associated with the AP. The user computing device is enabled to manage the presentation using one or more presentation control applications on the controlled device (block 912). The controlled device determines periodically or at select times if the user computing device is still operably connected to the same AP (block 914). A determination is made at block 916 as to whether the user computing device is still operably connected to the same AP. If not, the method passes to block 918 where the controlled device determines the user computing device is no longer proximate to the controlled device. Based on that determination, controlled device disables the user computing device from managing the presentation and the user computing device is unable to manage the presentation (block 920). For example, the controlled device can disconnect from the network channel.

When the user computing device is operably connected to the same AP, the process continues at block 922 where the user computing device can transmit location data associated with a location of the user computing device to the controlled device. This allows the controlled device to determine the location of the user computing device and confirm the user computing device is proximate to the controlled device. The user computing device continues to be enabled to manage the presentation on the controlled device (block 924). The process then returns to block 912. Block 922 is optional and can be omitted in other embodiments.

In some embodiments, aspects of the method shown in FIG. 3 can be combined with aspects of the process depicted in FIG. 6, and vice versa. In a non-limiting example, a location-based service can be used in the method of FIG. 3 to confirm the location of the user computing device. Alternatively, a controlled device may transmit the short-range wireless signal in the process of FIG. 6 and confirm the location of the user computing device by determining the controlled device and the user computing device are operably connected to the same AP.

Figure 10:
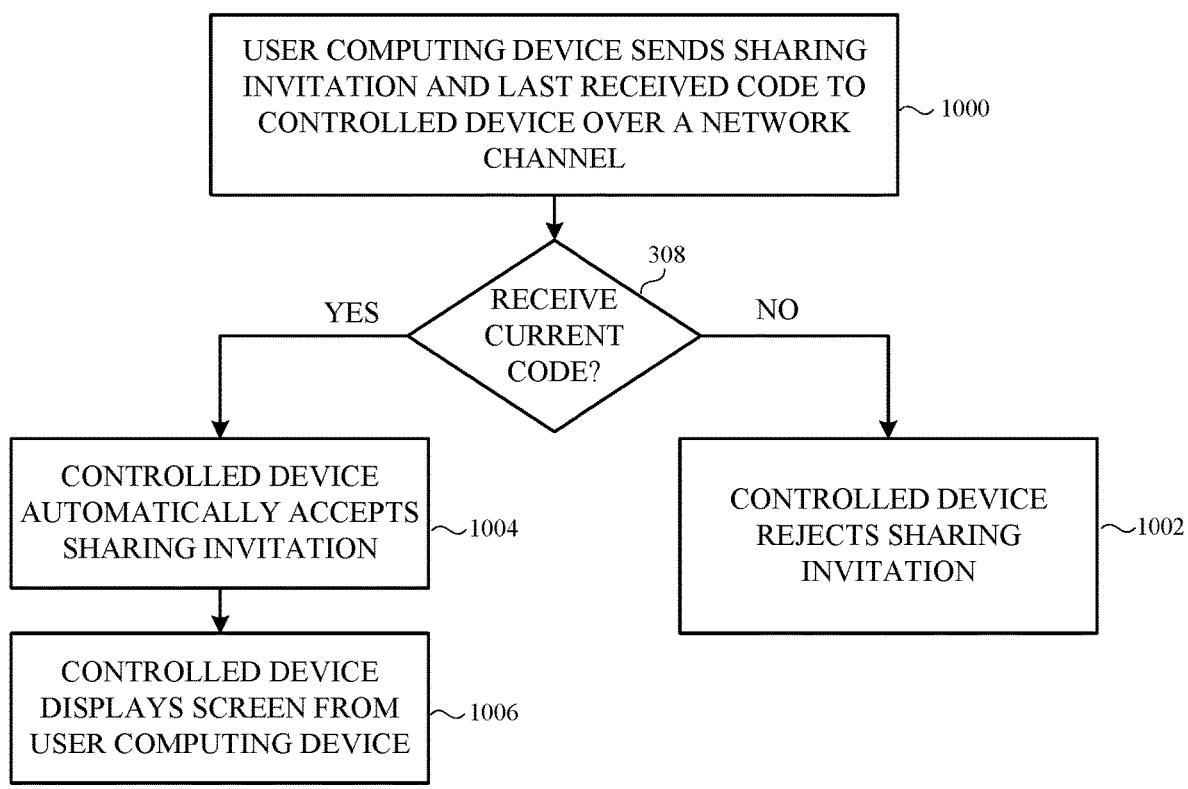
FIG. 10 depicts a flowchart of an example method of a user computing device casting a screen onto the controlled device.

FIG. 10 depicts a flowchart of an example method of a user computing device casting a screen onto the controlled device. Although the process is described in conjunction with screencasting, the method can be used to share or mirror a screen on the user computing device. Initially, the user computing device transmits a sharing request or invitation to the controlled device over a network channel (block 1000). The sharing invitation includes the last M-bit code received by the user computing device over a short-range wireless connection.

Next, as shown at block 308, the controlled device determines if the received code matches one or more codes recently transmitted to the user computing device in the short-range wireless signal. As described earlier, the controlled device can determine if the received code matches one of the last D codes transmitted by the controlled device. When the code received in the sharing invitation does not match the last code (or one of the last D codes), the controlled device refuses the sharing invitation (block 1002). Accordingly, the screen displayed on the user computing device is not cast onto the display device. In a non-limiting example, the controlled device transmits a rejection notice to the user computing device when the controlled device refuses the sharing invitation.

When the code received in the sharing invitation matches the last code (or one of the last D codes), the controlled device automatically accepts the sharing invitation (block 1004). The automatic acceptance is performed without any user input or interaction. The screen received from the user computing device over the network channel is then displayed on the display device within or operably connected to the controlled device (block 1006). In some embodiments, the screencasting, screen mirror, or screen sharing continues as long as the user computing device is proximate to the controlled device. In such embodiments, blocks 314, 316, 318, 320, and 324 in FIG. 3 are performed. After block 320, the screencasting, screen mirroring, or screen sharing continues. After block 324, the screencasting, screen mirroring, or screen sharing is terminated.

Figure 11:
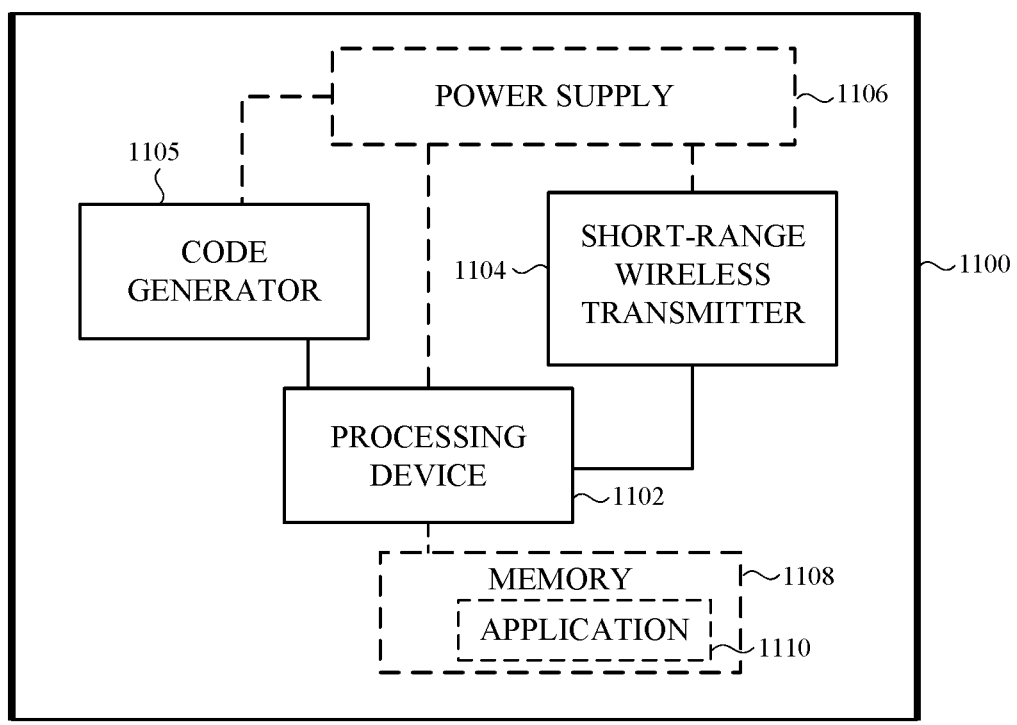
FIG. 11 is a block diagram illustrating an example short-range wireless transmitter.

FIG. 11 is a block diagram illustrating an example short-range wireless transmitter. In some embodiments, a short-range wireless transmitter is provided in a stand-alone device or a device that is operably connected to a controlled device. An example of a stand-alone device is a beacon device. Examples of devices that can be operably connected to the controlled device include, but are not limited to, a Universal Serial Bus (USB) memory stick or a memory card.

The device 1100 includes a processing device 1102 operably connected to a short-range wireless transmitter 1104. Any suitable processing device 1102 can be used. For example, the processing device 1102 may be a central processing unit, a microprocessor, an application specific integrated circuit, a graphics processing unit, a field programmable gate array, or combinations thereof.

The device 1100 includes a code generator 1105 that is operable to provide a rotating code. As described earlier, the rotating code can be a rotating M-bit code (M is a number greater than one), a rotating image (e.g., a QR code), an audio signal, or any other element that can be changed at select times and captured or received by a user computing device. In a non-limiting example, the code generator is a random number generator or a QR code generator.

The device 1100 may optionally include a power supply 1106. For example, when the device 1100 is a stand-alone device, the stand-alone device includes the power supply 1106. Any suitable power supply 1106 can be used. One example of a power supply 1106 is one or more batteries. In some embodiments, when the device 1100 is device that operably connects to the presentation control device, the device 1100 omits the power supply 1106.

The device 1100 can optionally include a memory 1108 that stores an application 1110 that a user computing device will interact with when the user computing device is enabled to manage the controlled device. For example, the application 1110 can be a presentation application, a web browser, a video player, or an audio player. In some embodiments, the device 1100 may not include the memory 1108 and/or the application 1110.

Figure 12:
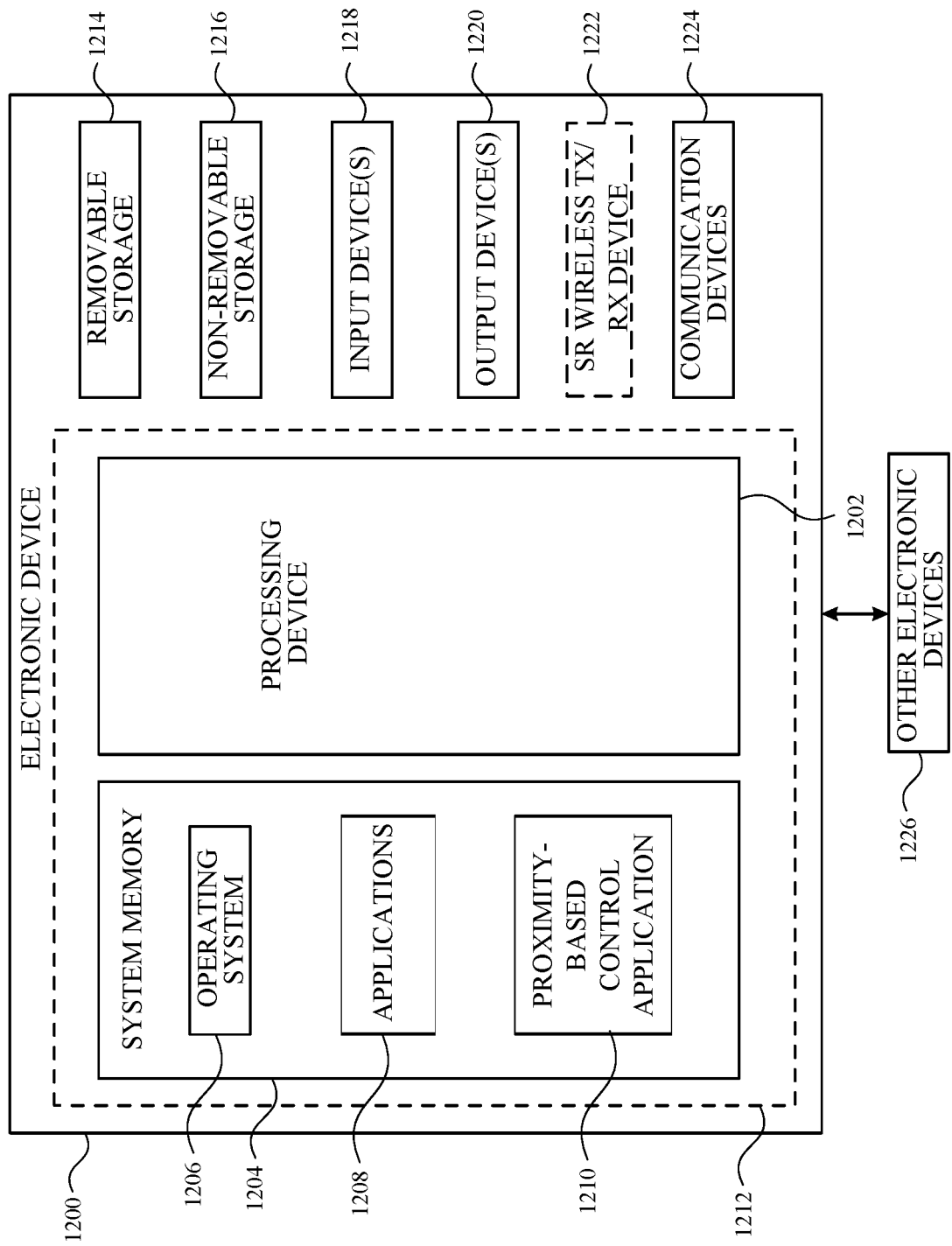
FIG. 12 is a block diagram depicting example physical components of a computing device with which aspects of the disclosure may be practiced.
Figure 13A:
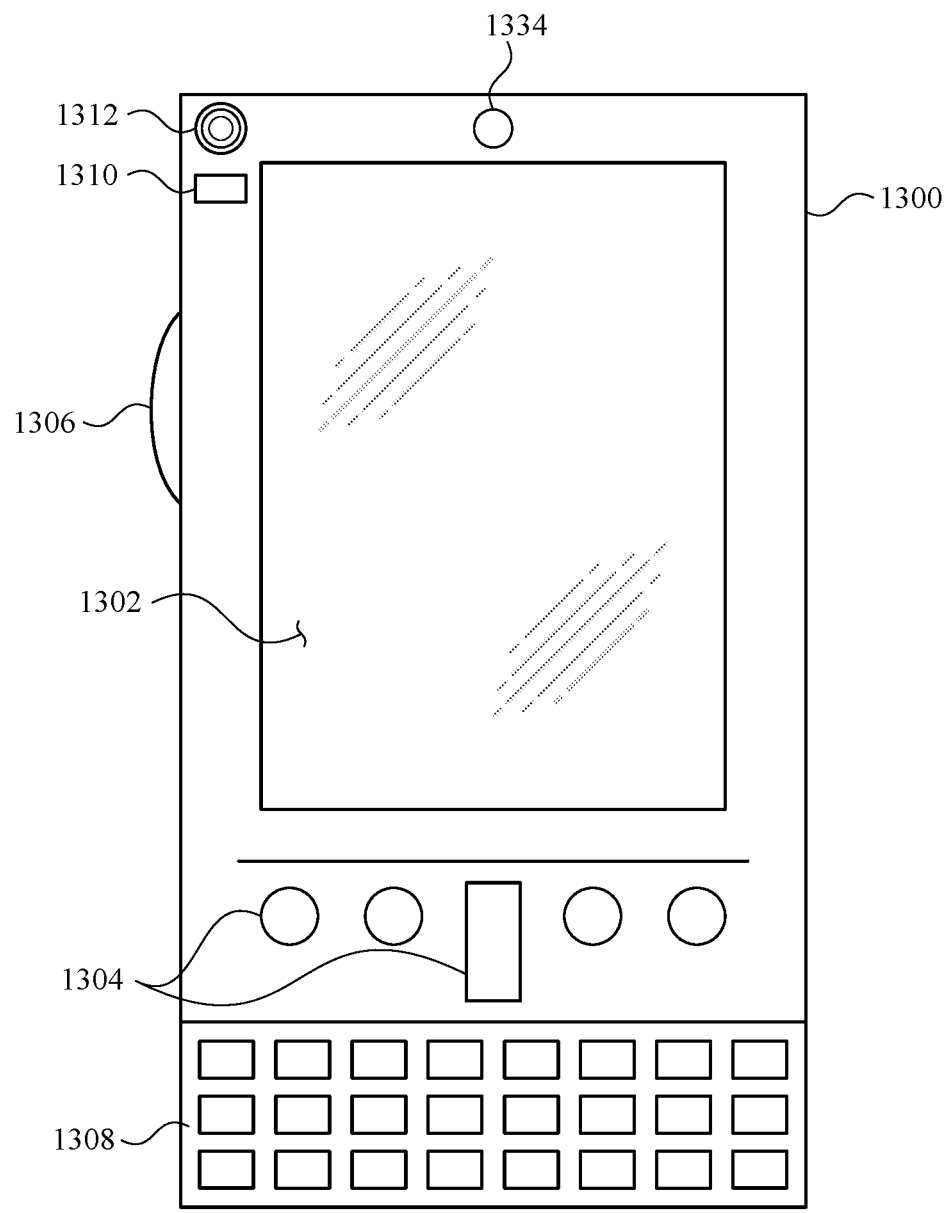
FIGS. 13A-13B are simplified block diagrams illustrating a mobile computing device with which aspects of the present disclosure may be practiced.
Figure 13B:
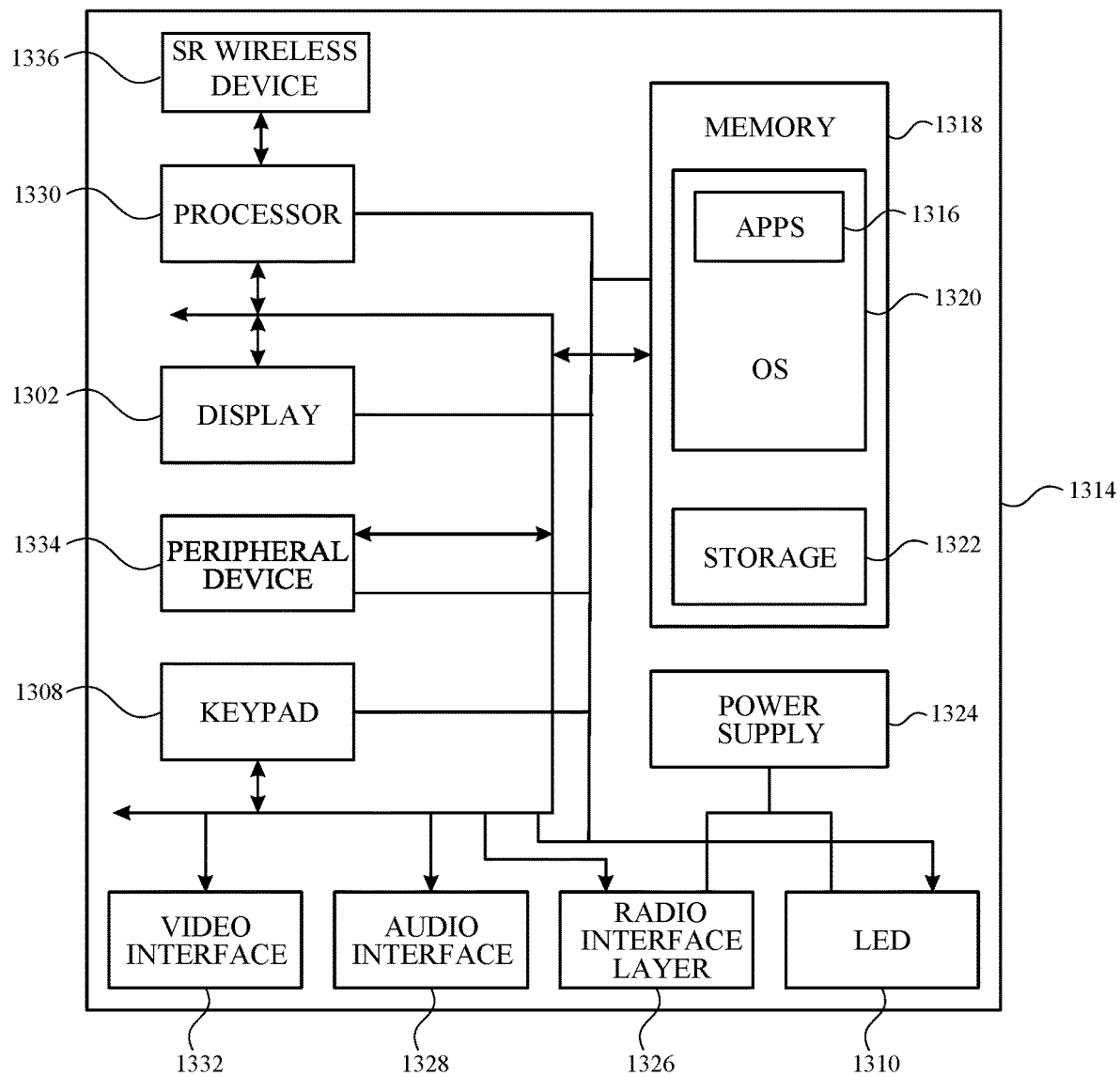
Figure 14:
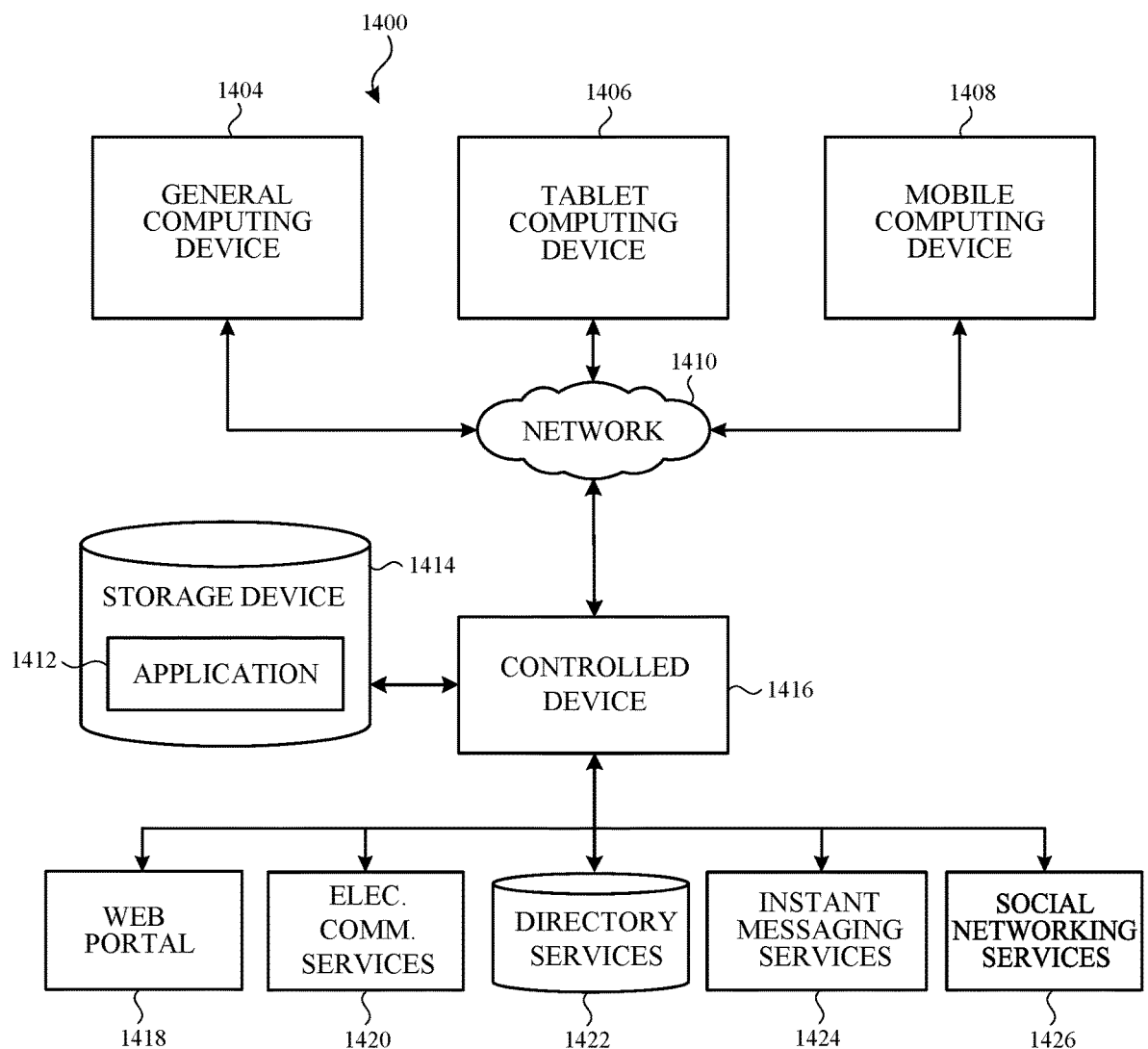
FIG. 14 is a block diagram depicting a distributed computing system in which aspects of the present disclosure may be practiced.

FIGS. 12-14 and the associated descriptions provide a discussion of a variety of operating environments in which aspects of the disclosure may be practiced. However, the devices and systems illustrated and discussed with respect to FIGS. 12-14 are for purposes of example and illustration and are not limiting of a vast number of electronic device configurations that may be utilized for practicing aspects of the disclosure, as described herein.

FIG. 12 is a block diagram illustrating physical components (e.g., hardware) of an electronic device 1200 with which aspects of the disclosure may be practiced. The controlled device and/or the user computing device can be implemented as the electronic device 1200. In a basic configuration, the electronic device 1200 includes at least one processing device 1202 and a system memory 1204. Any suitable processing device 1202 can be used. For example, the processing device 1202 may be a central processing unit, a microprocessor, an application specific integrated circuit, a graphics processing unit, a field programmable gate array, or combinations thereof.

Depending on the configuration and type of the electronic device 1200, the system memory 1204 may comprise, but is not limited to, volatile storage (e.g., random access memory), non-volatile storage (e.g., read-only memory), flash memory, or any combination of such memories. The system memory 1204 may include a number of program modules and data files, such as an operating system 1206, one or more applications 1208 (including a presentation control application), and a proximity-based control application 1210 for enabling a user computing device to access, interact with, and/or control a presentation displayed on a display. While executing on the processing device 1202, the proximity-based control application 1210 may perform and/or cause to be performed processes including, but not limited to, the aspects as described herein.

The operating system 1206, for example, may be suitable for controlling the operation of the electronic device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1212.

The electronic device 1200 may have additional features or functionality. For example, the electronic device 1200 may also include additional data storage devices (removable and/or non-removable) such as, for example, magnetic disks, optical disks, or tape. Such additional storage is illustrated in FIG. 12 by a removable storage device 1214 and a non-removable storage device 1216. The electronic device 1200 may also have one or more input device(s) 1218 such as a keyboard, a trackpad, a mouse, a pen, a sound or voice input device, a touch, force and/or swipe input device, etc. The output device(s) 1220 such as a display, speakers, a printer, etc. may also be included. The aforementioned devices are examples and others may be used.

The electronic device 1200 may include a short-range wireless device 1222. The short-range wireless device 1222 is implemented as a short-range wireless transmitter, receiver, or transceiver. For example, when the controlled device is configured as the electronic device 1200, the controlled device includes a wireless transmitter or transceiver. When the user computing device is configured as the electronic device 1200, the user computing device includes a wireless receiver or transceiver.

The electronic device 1200 also includes one or more communication devices 1224 allowing communications with other electronic devices 1226. Examples of suitable communication devices 1224 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1204, the removable storage device 1214, and the non-removable storage device 1216 are all computer-readable storage media examples (e.g., storage device). The computer-readable storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1200. Any such computer-readable storage media may be part of the electronic device 1200. Computer-readable storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 13A-13B illustrate a mobile electronic device 1300, for example, a mobile telephone, a smart phone, wearable computer (such as a smart watch), a tablet computer, a laptop computer, and the like, with which embodiments of the disclosure may be practiced. With reference to FIG. 13A, one aspect of a mobile electronic device 1300 for implementing the aspects described herein is illustrated.

In a basic configuration, the mobile electronic device 1300 is a handheld computer having both input elements and output elements. The mobile electronic device 1300 typically includes a display 1302 and one or more input buttons 1304 that allow the user to enter information into the mobile electronic device 1300. The display 1302 of the mobile electronic device 1300 may also function as an input device (e.g., a display that accepts touch and/or force input).

If included, an optional side input element 1306 allows further user input. The side input element 1306 may be a rotary switch, a button, or any other type of manual input element. In alternative aspects, mobile electronic device 1300 may incorporate more or less input elements. For example, the display 1302 may not be a touch screen in some embodiments. In yet another alternative embodiment, the mobile electronic device 1300 is a portable phone system, such as a cellular phone. The mobile electronic device 1300 may also include an optional keypad 1308. Optional keypad 1308 may be a physical keypad or a "soft" keypad generated on the touch screen display.

In various embodiments, the output elements include the display 1302 for showing a graphical user interface (GUI) of an application that displays presentations, social networking sites, search results, and other online sites and documents, a visual indicator 1310 (e.g., a light emitting diode), and/or an audio transducer 1312 (e.g., a speaker). In some aspects, the mobile electronic device 1300 incorporates a vibration transducer for providing the user with tactile feedback. In yet another aspect, the mobile electronic device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one aspect of a mobile electronic device 1300. That is, the mobile electronic device 1300 can incorporate a system (e.g., an architecture) 1314 to implement some aspects. In one embodiment, the system 1314 is implemented as a "smart phone" capable of running one or more applications (e.g., browser, electronic messages, calendaring, contact managers, messaging clients, games, media clients/players, diagramming, and sharing applications and so on). In some aspects, the system 1314 is integrated as an electronic device, such as an integrated personal digital assistant (PDA) and wireless phone.

One or more application programs 1316 may be loaded into the memory 1318 and run on or in association with the operating system 1320. Examples of the application programs include phone dialer programs, electronic message applications, word processing programs, spreadsheet programs, Internet browser programs, and so forth.

The system 1314 also includes a non-volatile storage area 1322 within the memory 1318. The non-volatile storage area 1322 may be used to store persistent information that should not be lost when the system 1314 is powered down.

The application programs 1316 may use and store information in the non-volatile storage area 1322, such as documents, messages, and the like. A synchronization application (not shown) also resides on the system 1314 and is programmed to interact with a corresponding synchronization application resident on a host computer to keep the information stored in the non-volatile storage area 1322 synchronized with corresponding information stored at the host computer.

The system 1314 has a power supply 1324, which may be implemented as one or more batteries. The power supply 1324 may further include an external power source, such as an AC adapter or a powered docking cradle that supplements or recharges the batteries.

The system 1314 may also include a radio interface layer 1326 that performs the function of transmitting and receiving radio frequency communications. The radio interface layer 1326 facilitates wireless connectivity between the system 1314 and the "outside world," via a communications carrier or service provider. Transmissions to and from the radio interface layer 1326 are conducted under control of the operating system 1320. In other words, communications received by the radio interface layer 1326 may be disseminated to the application programs 1316 via the operating system 1320, and vice versa.

The visual indicator 1310 may be used to provide visual notifications, and/or an audio interface 1328 may be used for producing audible notifications via an audio transducer (e.g., audio transducer 1312 illustrated in FIG. 13A). In the illustrated embodiment, the visual indicator 1310 is a light emitting diode (LED) and the audio transducer 1312 may be a speaker. These devices may be directly coupled to the power supply 1324 so that when activated, they remain on for a duration dictated by the notification mechanism even though the processor 1330 and other components might shut down for conserving battery power. The LED may be programmed to remain on indefinitely until the user takes action to indicate the powered-on status of the device.

The audio interface 1328 is used to provide audible signals to and receive audible signals from the user (e.g., voice input such as described above). For example, in addition to being coupled to the audio transducer 1312, the audio interface 1328 may also be coupled to a microphone to receive audible input, such as to facilitate a telephone conversation. In accordance with embodiments of the present disclosure, the microphone may also serve as an audio sensor to facilitate control of notifications, as will be described below.

The system 1314 may further include a video interface 1332 that enables an operation of peripheral device 1334 (e.g., on-board camera) to record still images, video stream, and the like.

A mobile electronic device 1300 implementing the system 1314 may have additional features or functionality. For example, the mobile electronic device 1300 may also include additional data storage devices (removable and/or non-removable) such as, magnetic disks, optical disks, or tape. Such additional storage is illustrated in FIG. 13B by the non-volatile storage area 1322.

Data/information generated or captured by the mobile electronic device 1300 and stored via the system 1314 may be stored locally on the mobile electronic device 1300, as described above, or the data may be stored on any number of storage media that may be accessed by the device via the radio interface layer 1326 or via a wired connection between the mobile electronic device 1300 and a separate electronic device associated with the mobile electronic device 1300, for example, a server computing device in a distributed computing network, such as the Internet. As should be appreciated such data/information may be accessed via the mobile electronic device 1300 via the radio interface layer 1326 or via a distributed computing network. Similarly, such data/information may be readily transferred between electronic devices for storage and use according to well-known data/information transfer and storage means, including electronic mail and collaborative data/information sharing systems.

As should be appreciated, FIGS. 13A and 13B are described for purposes of illustrating the present methods and systems and is not intended to limit the disclosure to a particular sequence of steps or a particular combination of hardware or software components.

FIG. 14 is a block diagram illustrating a distributed system in which aspects of the disclosure may be practiced. The system 1400 includes a general computing device 1404 (e.g., a desktop computer), a tablet computing device 1406, and/or a mobile computing device 1408. The general computing device 1404, the tablet computing device 1406, and the mobile computing device 1408 can each include the components, or be connected to the components, that are shown associated with the electronic device 1200 in FIG. 12 or the mobile electronic device 1300 in FIGS. 13A-13B.

The general computing device 1404, the tablet computing device 1406, and the mobile computing device 1408 are each configured to access one or more networks (represented by network 1410) to interact with one or more applications 1412 stored in one or more storage devices (represented by storage device 1416) and executed on the controlled device 1418.

In some aspects, the controlled device 1418 can access and/or receive various types of services, communications, documents and information transmitted from other sources, such as a web portal 1420, an electronic communications services 1422, directory services 1424, instant messaging and/or text services 1426, and/or social networking services 1428. In some instances, these sources may provide robust reporting, analytics, data compilation and/or storage service, etc., whereas other services may provide search engines or other access to data and information, images, graphics, web sites, videos, document processing and the like.

As should be appreciated, FIG. 14 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternative aspects falling within the spirit of the broader aspects of the general inventive concept embodied in this application that do not depart from the broader scope of the claimed disclosure.

The invention claimed is:

1. A method of operating a controlled device for selectively granting a user computing device an access to a function of the controlled device based on a physical proximity of the user computing device to the controlled device, comprising:
   repeatedly broadcasting, by the controlled device via a first wireless communication channel, a rotating code that changes after an expiration of a time period wherein the first wireless communication channel has a wireless communication range that allows the user computing device to receive the broadcasted rotating code only when the user computing device is positioned within the wireless communication range from the controlled device;
   repeatedly receiving, by the controlled device, a code transmitted automatically from the user computing device via the first communication channel or a second communication channel that is different from the first communication channel;
   in response to receiving, by the controlled device, each code from the user computing device via the first or second communication channel, determining whether each received code corresponds to the rotating code most recently broadcasted via the first communication channel; in response to determining, by the controlled device, that each received code corresponds to the most recently broadcasted rotating code, granting the user computing device an access to control a function of the controlled device; and in response to determining, by the controlled device, that each received code does not correspond to the most recently broadcasted rotating code, denying the user computing device the access to control the function of the controlled device.

2. The method of claim 1, wherein determining whether each received code corresponds to the most recently broadcasted rotating code comprises determining whether each received code includes two most recently broadcasted rotating codes.

3. The method of claim 1, wherein the time period is thirty seconds.

4. The method of claim 1, wherein the function of the controlled device comprises:
   controlling a presentation displayed on a display device operably connected to the controlled device; or
   controlling an audio output from the controlled device.

5. The method of claim 1, wherein:
   the controlled device is connected to a display device, and the method further comprises:
      receiving, from the user computing device, a sharing invitation; and
      determining whether the received sharing invitation includes the most recently broadcasted rotating code; and
      in response to determining that the received sharing invitation includes the most recently broadcasted rotating code, controlling the display device to display a screen of the user computing device.

6. The method of claim 5, further comprising, in response to determining that the received sharing invitation does not include the most recently broadcasted rotating code, transmitting, to the user computing device, a rejection of the sharing invitation.

7. A controlled device configured to selectively grant a user computing device an access to a function of the controlled device based on a physical proximity of the user computing device to the controlled device, the controlled device comprising:

a hardware processor; and a computer-readable medium in communication with the processor and storing instructions that, when executed by the processor, cause the processor to control the controlled device to perform:

repeatedly broadcasting, via a first wireless communication channel, a rotating code that changes after an expiration of a time period, wherein the first wireless communication channel has a wireless communication range that allows the user computing device to receive the broadcasted rotating code only when the user computing device is positioned within the wireless communication range from the controlled device;

repeatedly receiving, by the controlled device, a code transmitted automatically from the user computing device via the first communication channel or a second communication channel that is different from the first communication channel;

in response to receiving each code from the user computing device via the first or second communication channel, determining whether each received code corresponds to the rotating code most recently broadcasted via the first communication channel;

in response to determining that each received code corresponds to the most recently broadcasted rotating code, granting the user computing device an access to control a function of the controlled device; and in response to determining that each received code does not correspond to the most recently broadcasted rotating code, denying the user computing device the access to control the function of the controlled device.

8. The controlled device of claim 7, wherein, for determining whether each received code corresponds to the most recently broadcasted rotating code, the instructions, when executed by the processor, further cause the processor to control the controlled device to perform determining whether each received code includes two most recently broadcasted rotating codes.

9. The controlled device of claim 7, wherein the time period is thirty seconds.

10. The controlled device of claim 7, wherein the function of the controlled device comprises:

controlling a presentation displayed on a display device operably connected to the controlled device; or controlling an audio output from the controlled device.

11. The controlled device of claim 7, wherein:

the controlled device is connected to a display device, and the instructions, when executed by the processor, further cause the processor to control the controlled device to perform:

receiving, from the user computing device, a sharing invitation; and determining whether the received sharing invitation includes the most recently broadcasted rotating code; and in response to determining that the received sharing invitation includes the most recently broadcasted rotating code, controlling the display device to display a screen of the user computing device.

12. The controlled device of claim 11, wherein the instructions, when executed by the processor, further cause the processor to control the controlled device to perform, in response to determining that the received sharing invitation does not include the most recently broadcasted rotating code, transmitting, to the user computing device, a rejection of the sharing invitation.

13. A non-transitory computer-readable medium comprising instructions that, when executed by a processor, cause the processor to control a controlled device to perform operations for selectively granting a user computing device an access to a function of the controlled device based on a physical proximity of the user computing device to the controlled device, the operations comprising:

repeatedly broadcasting, via a first wireless communication channel, a rotating code that changes after an expiration of a time period, wherein the first wireless communication channel has a wireless communication range that allows the user computing device to receive the broadcasted rotating code only when the user computing device is positioned within the wireless communication range from the controlled device;

repeatedly receiving, by the controlled device, a code transmitted automatically from the user computing device via the first communication channel or a second communication channel that is different from the first communication channel;

in response to receiving each code from the user computing device via the first or second communication channel, determining whether each received code corresponds to the rotating code most recently broadcasted via the first communication channel;

in response to determining that each received code corresponds to the most recently broadcasted rotating code, granting the user computing device an access to control a function of the controlled device; and in response to determining that each received code does not correspond to the most recently broadcasted rotating code, denying the user computing device the access to control the function of the controlled device.

14. The non-transitory computer-readable medium of claim 13, wherein, for determining whether each received code corresponds to the most recently broadcasted rotating code, the instructions, when executed by the processor, further cause the processor to control the controlled device to perform an operation of determining whether each received code includes two most recently broadcasted rotating codes.

15. The non-transitory computer-readable medium of claim 13, wherein the time period is thirty seconds.

16. The non-transitory computer-readable medium of claim 13, wherein the function of the controlled device comprises:

controlling a presentation displayed on a display device operably connected to the controlled device; or controlling an audio output from the controlled device.

17. The non-transitory computer-readable medium of claim 13, wherein:

the controlled device is connected to a display device, and the instructions, when executed by the processor, further cause the processor to control the controlled device to perform operations of:

receiving, from the user computing device, a sharing invitation; and determining whether the received sharing invitation includes the most recently broadcasted rotating code; and in response to determining that the received sharing invitation includes the most recently broadcasted rotating code, controlling the display device to display a screen of the user computing device.

18. The non-transitory computer-readable medium of claim 13, wherein the instructions, when executed by the processor, further cause the processor to control the controlled device to perform, in response to determining that the received sharing invitation does not include the most recently broadcasted rotating code, an operation of transmitting, to the user computing device, a rejection of the sharing invitation.

* * * * *

UNITED STATES PATENT AND TRADEMARK OFFICE
CERTIFICATE OF CORRECTION

PATENT NO. : 11,265,711 B2
APPLICATION NO. : 16/570458
DATED : March 1, 2022
INVENTOR(S) : Houchen et al.

Page 1 of 1

It is certified that error appears in the above-identified patent and that said Letters Patent is hereby corrected as shown below:

In the Claims

Column 18, Line 50, "and" should be deleted.

Column 19, Line 56, "and" should be deleted.

Column 20, Line 60, "and" should be deleted.

Column 21, Line 2, number "13" should read -17-.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*